United States Patent
Kim et al.

(10) Patent No.: US 6,244,757 B1
(45) Date of Patent: Jun. 12, 2001

(54) THERMALLY EXPANDED CORE FIBER FABRICATION METHOD AND OPTICAL FIBER COUPLING METHOD

(75) Inventors: Sung-Jun Kim, Pyeongtaek; Jeong-Mee Kim, Yongin, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/223,308

(22) Filed: Dec. 30, 1998

(30) Foreign Application Priority Data

Dec. 30, 1997 (KR) .................................... 97-77782

(51) Int. Cl.⁷ .............................. G02B 6/255; G02B 6/30
(52) U.S. Cl. .................... 385/96; 385/49; 385/50; 385/95
(58) Field of Search ...................... 385/96–99, 42, 385/46–49, 50; 430/96, 321, 330

(56) References Cited

U.S. PATENT DOCUMENTS

| | | | |
|---|---|---|---|
| 4,715,876 | * 12/1987 | Osaka et al. | ............................ 385/42 |
| 5,371,818 | * 12/1994 | Presby | ..................................... 385/49 |
| 5,978,534 | * 11/1999 | O'Rourke et al. | ...................... 385/52 |
| 6,048,103 | * 4/2000 | Furukata et al. | ........................ 385/73 |

FOREIGN PATENT DOCUMENTS

| | | |
|---|---|---|
| 64-51902 | 3/1989 | (JP) . |
| 4-67106 | 3/1992 | (JP) . |
| 5-119235 | 5/1993 | (JP) . |
| 5-264858 | 10/1993 | (JP) . |
| 6-347661 | 12/1994 | (JP) . |
| 7-13036 | 1/1995 | (JP) . |

* cited by examiner

*Primary Examiner*—Thong Nguyen
(74) *Attorney, Agent, or Firm*—Robert E. Bushnell, Esq.

(57) ABSTRACT

A method for fabricating a thermally expanded core (TEC) fiber including the steps of arc-fusion splicing two optical fibers having different clad outer diameters, and cutting boundary surface between an optical fiber having a small clad outer diameter and an optical fiber having a large clad outer diameter of the two optical fibers to obtain the thermally expanded core (TEC) fiber. Also, the method further includes the step of polishing the cutting face of the optical fiber having a small clad outer diameter of the two cut optical fibers.

8 Claims, 1 Drawing Sheet

THERMALLY EXPANDED CORE FIBER FABRICATION METHOD AND OPTICAL FIBER COUPLING METHOD

CLAIM OF PRIORITY

This application makes reference to, incorporates the same herein, and claims all benefits accruing under 35 U.S.C. §119 from applications for Thermally Expanded Core Fiber Fabrication Method and Optical Fiber Coupling Method earlier filed in the Korean Industrial Property Office on Dec. 30, 1997, and there duly assigned Serial No. 77782/1997.

BACKGROUND OF THE INVENTION

1. Field of the Invention

The present invention relates to an optical fiber fabrication method, and more particularly, to a fabrication method of a thermally extended core (TEC) fiber by which a core of an optical fiber is expanded using diffusion generated when optical fibers having different outer diameters are arc-fusion-spliced, and an optical fiber coupling method.

2. Description of the Related Art

Optical elements having optical fibers as their input/output ports use a TEC fiber so as to be coupled effectively when light received from the section of the optical fiber in an input port pass through functional elements to then be output to an output port. In an exemplary TEC fiber fabrication method of the contemporary art, a TEC fiber is fabricated such that a flame is applied in close proximity to an optical fiber whose core is to be expanded, using a torch which generates a high temperature heat and then the optical fiber is thermally treated at a high temperature lower than the fusion point. Then, the thermally treated fiber is post-treated to fabricate the TEC fiber. However, according to this method, much fabrication time and cost are required. Also, a problem may arise in the repeatability of the step of thermally expanding a core to a constant size.

Since the diameter of a fiber core is very small, i.e., about 10 $\mu$m, in order to couple two fibers, cores of the two fibers to be coupled must be precisely aligned. Even if the coupled cores are only slightly misaligned, the fiber coupling efficiency decreases considerably. Also, when an optical fiber and an optical element are coupled, the coupling efficiency decreases if the size of a waveguide is small and the shapes of waveguides are not the same.

SUMMARY OF THE INVENTION

It is therefore an object of the present invention to provide an improved method of fabricating a TEC fiber.

It is a further object to provide a TEC fiber fabrication method which allows fabrication more quickly and at lower cost.

It is a yet further object of the present invention to provide a TEC fiber fabrication method which eliminates problems in variability of the TEC core size.

It is another object of the present invention to provide an improved optical fiber coupling method.

It is another object of the present invention to provide a method for coupling two optical fibers having different clad diameters.

To achieve these objects, the present invention provides a method for fabricating a TEC fiber using two optical fibers having different outer diameters for enhancing the coupling efficiency of an optical signal. Accordingly, there is provided a method for fabricating a thermally expanded core (TEC) fiber including the steps of arc-fusion splicing two optical fibers having different clad outer diameters, and cutting a boundary surface between the optical fiber having the smaller clad outer diameter and the optical fiber having the larger clad outer diameter of the two optical fibers to obtain the thermally expanded core (TEC) fiber. Preferably, the method may further include the step of polishing the cut face of the optical fiber having the smaller clad outer diameter of the two cut optical fibers.

To achieve the above objects, there is also provided a method for coupling two optical fibers having different clad outer diameters including the steps of aligning the two optical fibers having different clad outer diameters, and coupling the optical fibers by arc-fusion splicing the aligned optical fibers by using an arc fusion splicer.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE DRAWINGS

Figure 1:
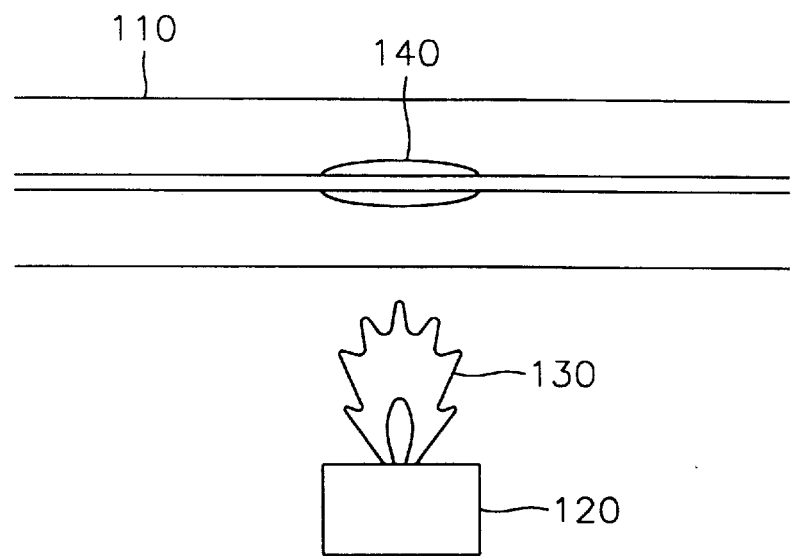
FIG. 1 is an illustration of an exemplary method of the conventional art for fabricating a thermally expanded core (TEC) fiber.

Turning now to the drawings, the exemplary TEC fiber fabrication method of the contemporary art discussed above is shown in FIG. 1. TEC fiber 140 is fabricated such that flame 130 is applied in close proximity to optical fiber 110 whose core is to be expanded using torch 120 which generates a high temperature heat and then the optical fiber is thermally treated at a high temperature lower than the fusion point. Then, the thermally treated fiber is post-treated to fabricate TEC fiber 140. However, according to this method, much fabrication time and cost are required. Also, a problem may arise in the repeatability of the step of thermally expanding a core to a constant size.

Figure 2:
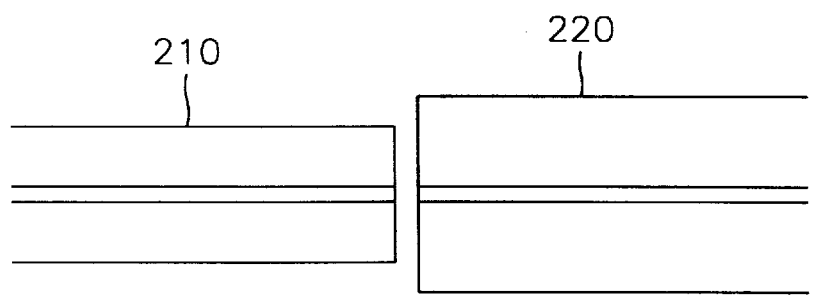
FIG. 2 is an illustration of two optical fibers having different clad diameters.

The present invention will now be described in detail with reference to the accompanying drawings. FIG. 2 shows two optical fibers having different clad diameters, in which reference numeral 210 denotes an optical fiber having a small clad diameter, and reference numeral 220 denotes an optical fiber having a large clad diameter. However, the core diameters of the two optical fibers are equal to each other.

A core of one end of an optical fiber having a clad surrounding the core is expanded by arc-fusion splicing two optical fibers 210 and 220 having the same core diameters and different clad outer diameters using an arc fusion splicer. Then, the clad of an optical fiber having a small clad outer diameter is widened due to cohesion between two optical fibers having similar fusion points so that it is coupled to the clad of an optical fiber having a large clad outer diameter.

In the course of this coupling, the core of the optical fiber having the smaller clad outer diameter is also widened as the clad thereof is widened. The outer diameter of widened core 330 becomes larger than that of the original core of the optical fiber having the smaller clad outer diameter so that light is received in a relatively wider area. The boundary surface between the optical fiber having the smaller clad outer diameter and the optical fiber having the larger clad outer diameter is cut. Then, a high-quality TEC fiber can be obtained by polishing the cut face of the optical fiber having the smaller clad outer diameter.

Figure 3:
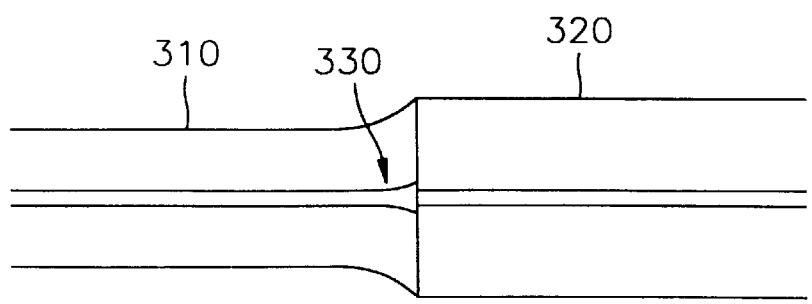
FIG. 3 is an illustration of a TEC fiber fabricated by arc-fusion splicing.

FIG. 3 is an illustration of a TEC fiber, in which reference numeral 310 denotes an optical fiber having a small clad diameter, reference numeral 320 denotes an optical fiber having a large clad diameter, and reference numeral 330 denotes a TEC fiber fabricated by arc-fusion splicing.

If optical fibers or an optical fiber and an optical element are coupled using the TEC fiber fabricated in the above-described manner, the coupling efficiency can be improved.

According to the TEC fiber fabrication method of the present invention, fabrication time and cost are reduced compared to the conventional method. Also, the core can be thermally expanded to a constant size.

Also, a high coupling efficiency can be realized without a precise alignment of cores to a finer extent, by splicing optical elements or optical fibers using the TEC fiber fabricated according to the present invention. Also, due to facilitated cohesion of optical fibers, the cost in connecting optical communication paths can be reduced.

What is claimed is:

1. A method for fabricating a thermally expanded core (TEC) fiber comprising the steps of:

arc-fusion splicing two optical fibers having different clad outer diameters; and cutting the boundary surface between the first optical fiber having the smaller clad outer diameter and the second optical fiber having the larger clad outer diameter of the two optical fibers to obtain a thermally expanded core (TEC) fiber.

2. The method according to claim 1, further comprising the step of polishing the cut face of the optical fiber having the smaller clad outer diameter of the two cut optical fibers.

3. The method of claim 2, where said two optical fibers have cores of the same diameter.

4. The method of claim 2, further comprising the steps of:

aligning the polished, cut face of the first optical fiber with a third optical fiber; and coupling the first optical fiber to the third optical fiber.

5. The method of claim 1, where said two optical fibers have cores of the same diameter.

6. A method for coupling an optical fiber and an optical element, comprising the steps of:

arc-fusion splicing a first optical fiber having a smaller clad outer diameter with a second optical fiber having a larger clad outer diameter;

cutting the boundary surface between the two optical fibers to obtain a thermally expanded core fiber;

polishing the cut face of the first optical fiber; and aligning the polished, cut face of the first optical fiber with an optical element; and coupling the first optical fiber to the optical element.

7. The method of claim 6, where the first optical fiber and the optical element have cores of the same diameter.

8. The method of claim 6, said step of coupling the first optical fiber to the optical element comprising arc-fusion splicing.

* * * * *